UNITED STATES PATENT OFFICE.

GEORG MERLING, OF FRANKFORT-ON-THE-MAIN, GERMANY, ASSIGNOR TO THE FARBWERKE, VORM. MEISTER, LUCIUS & BRÜNING, OF HÖCHST-ON-THE-MAIN, GERMANY.

HYDROBENZALDEHYDE AND PROCESS OF MAKING SAME.

SPECIFICATION forming part of Letters Patent No. 714,931, dated December 2, 1902.

Application filed July 7, 1900. Serial No. 22,770. (Specimens.)

*To all whom it may concern:*

Be it known that I, GEORG MERLING, Ph.D., a citizen of the Empire of Germany, residing in Frankfort-on the-Main, Germany, have invented certain new and useful Improvements in the Manufacture of Tetrahydro and Hexahydro Benzaldehydes, of which the following is a specification.

I have found that the hexahydro-oxy-benzylamin bases obtained according to my application, Serial No. 22,771, filed July 7, 1900, may be transformed into tetrahydro and hexahydrobenzylamin bases of the general formulæ:

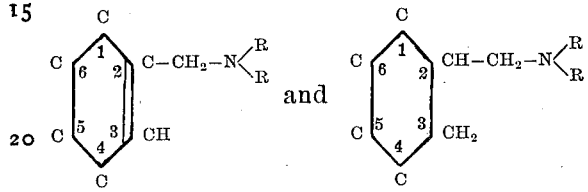

and (wherein R represents hydrogen or a fatty or aromatic radical,) it being undecided whether in the tetrahydrobenzylamin bases the double compound is lying between the carbon atoms "2" and "3" or between "3" and "4" by eliminating water or by substituting hydrogen for the hydroxyl of said hexahydro-oxy-benzylamin bases. Thus, for instance, from isopropyl-methyl-oxy-hexahydrobenzylamin, as described in my application before referred to, are obtained the two hydrobenzylamin bases:

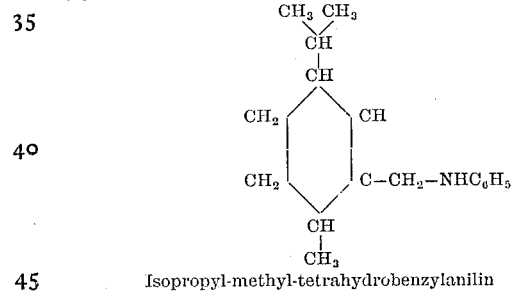

Isopropyl-methyl-tetrahydrobenzylanilin

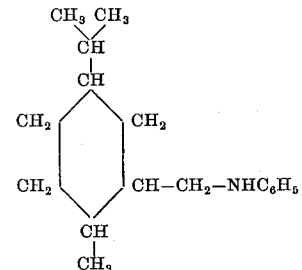

Isopropyl-methyl-hexahydrobenzylanilin.

and from the trimethyl-oxy-hydrobenzylanilin the two hydrobenzylamin bases:

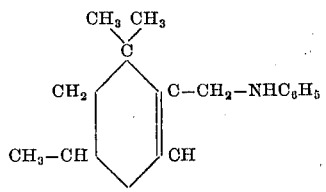

Trimethyl-tetrahydrobenzylanilin

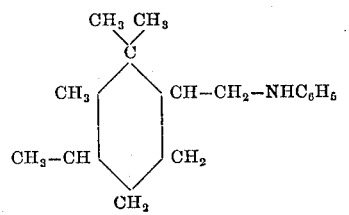

Trimethyl-hexahydrobenzylanilin.

The elimination of water from the hydrogenized oxybenzylamin bases is best effected by substituting chlorin for their hydroxyl in treating the compound with phosphorous pentachlorid. Thus chlorohydrobenzylamin bases are obtained of the type:

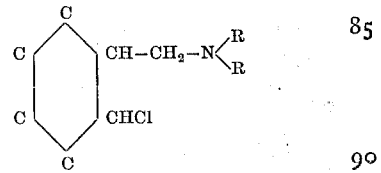

which on treatment with agents capable of eliminating hydrogen chlorid or reducing agents produce the two series of hydrobenzylamin bases above mentioned.

Example I: Transformation of the oxy base:

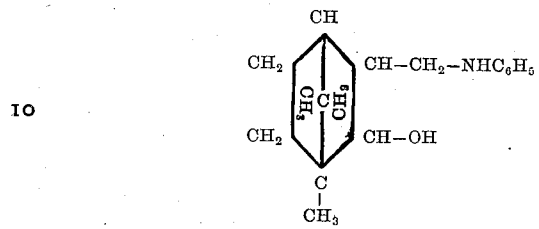

obtained from oxymethylenecamphoranilid into the bases:

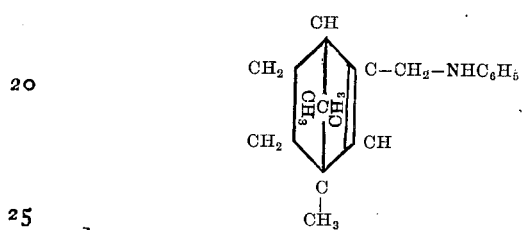

and

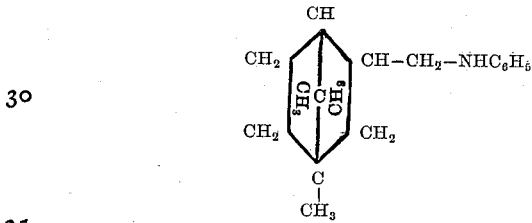

1. Transformation of the oxy base into the corresponding chlorated base:

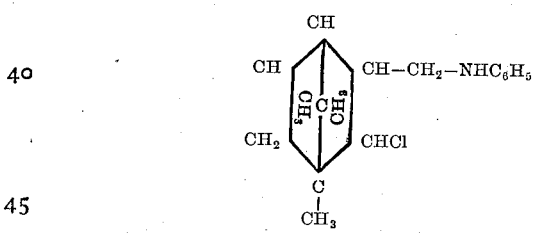

A part of the oxy base is dissolved in about ten parts of benzene, and the solution is saturated while cooling with hydrogen-chlorid gas. To the thin crystalline paste is gradually added with moderate heating somewhat more than one molecular proportion of phosphorous pentachlorid. The whole is then heated on the water-bath till the evolution of hydrochloric acid ceases, when water is carefully added to the clear solution, so as to destroy the phosphorous oxychlorid. Then an excess of sodium carbonate is carefully added, the benzene solution of the chlorated base is dried in the presence of anhydrous sodium sulfate, and the benzene is distilled at moderate temperature *in vacuo*, while simultaneously introducing a current of hydrogen. The chlorated base remains behind as a yellowish oil.

2. Transformation of the chlorated base obtained according to No. 1 into tetrahydrobenzylamin derivative:

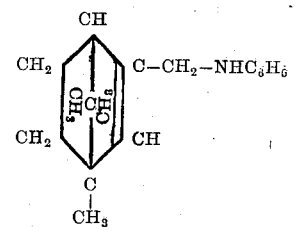

The oily chlorated base solidifies slowly when heated on the boiling-water bath and in the atmosphere of hydrogen and rapidly when heated to 130° centigrade to a solid crystalline cake of the hydrochlorid of the said unsaturated hydrobenzylamin base. The following equation illustrates the process:

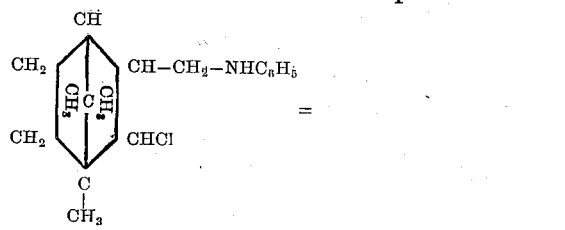

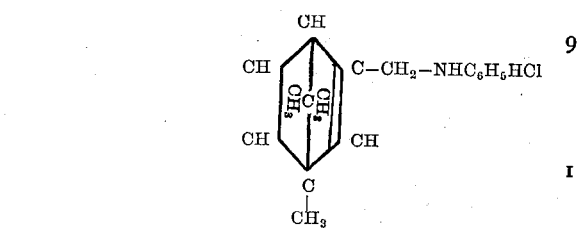

On washing with ether the pulverized crystalline mass becomes quite colorless. The base set free from the hydrochlorid by means of soda-lye forms colorless crystals melting at 38° centigrade and boiling *in vacuo* (twenty millimeters pressure) at 211° to 212° centigrade without decomposition. The same base is obtained if the chlorated base obtained according to No. 1 be heated with agents capable of eliminating hydrogen-chlorid—such, for instance, as alcoholic potash.

3. Manufacture of hexahydrobenzylamin derivative:

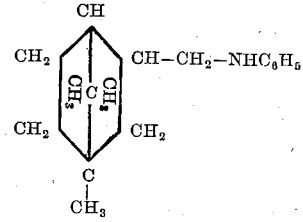

This base is obtained both from the chlorated base described in No. 1 as well as from the unsaturated hydrobenzylanilin base described in No. 2 if one part each of these bases is dissolved in ten parts of alcohol and to these solutions be gradually added one part of sodium, with finally heating. In both cases after expelling the alcohol with steam the base remains behind as a colorless thick oil boiling *in vacuo* at 220° centigrade (twenty millimeters pressure) without decomposing.

Example II: Transformation of trimethylhexahydro-oxy-benzylanilin:

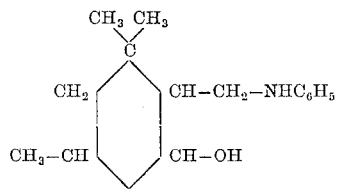

into

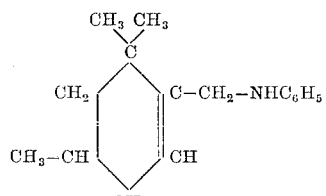

Trimethyl-tetra-hydrobenzylanilin.

and

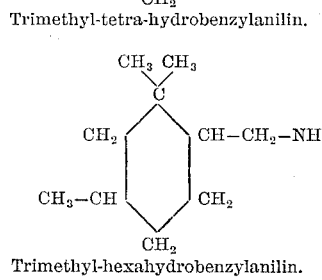

Trimethyl-hexahydrobenzylanilin.

1. Transformation of trimethyloxyhexahydrobenzylanilin into trimethylchlorohexahydrobenzylanilin:

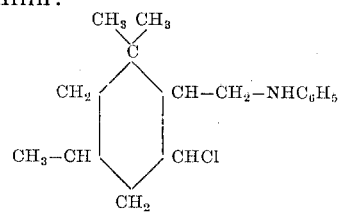

Six hundred and ten parts of the oxy base are dissolved in four thousand five hundred parts of benzene, and the solution is saturated with hydrogen-chlorid gas. No elimination of hydrochlorid takes place here. Into this clear solution are gradually introduced five hundred and thirty parts of phosphorous pentachlorid, (somewhat more than one molecule.) It dissolves with active evolution of hydrochloric acid. To complete the reaction, the solution is finally heated on the water-bath till the evolution of the hydrochloric acid ceases. The further working of the colorless benzene solution is carried out in exactly the same manner as described in Example I under No. 1 with the corresponding chlorated base from anilidomethylenecamphor. The trimethylchlorohexahydrobenzylanilin is a yellowish oil linking the chlorin much more than the chlorated base from anilidomethyleneocamphor described in Example I under No. 1.

2. Transformation of trimethylchlorohexahydrobenzylanilin obtained according to No. 1 into trimethyl-tetra-hydrobenzylanilin:

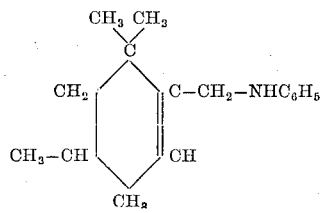

One part of trimethylchlorohexahydrobenzylanilin is heated for from four to five hours with ten parts of pulverized hydrate of potash and five parts of alcohol. The mass is then diluted with water and the alcohol distilled with steam. The trimethyl-tetra-hydrobenzylanilin remains as a brown layer of oil. It is extracted with ether, dried in the presence of hydrate of potash, the ether is distilled, and the oily residue is subjected to distillation *in vacuo*. The base boils without decomposing at 187° (nineteen millimeters pressure) and forms a colorless inodorous oil.

3. Manufacture of trimethyl-hexahydrobenzylanilin:

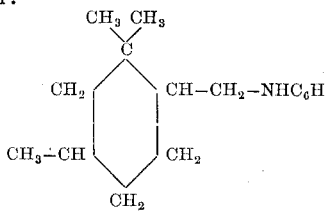

This base is obtained from trimethyl-tetra-hydrobenzylanilin, as described in No. 2, or from trimethylchlorohexahydrobenzylanilin, as described in No. 1, by treatment with reducing agents, preferably with alcohol and sodium. For this purpose one part of each of these bases is dissolved in twenty parts of absolute alcohol, and to each of these solutions are introduced two parts of sodium, with heating toward the end of the reaction. After distilling the alcohol with steam the oily base remains behind and boils *in vacuo* (fifteen millimeters pressure) at 190° centigrade without decomposing, colorless and inodorous oil.

Example III: Transformation of cis and trans-isopropyl-methyl-hexahydro-oxy-benzylamin:

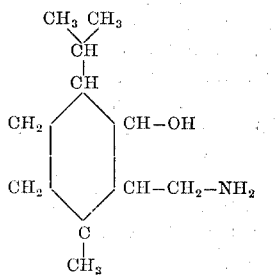

into

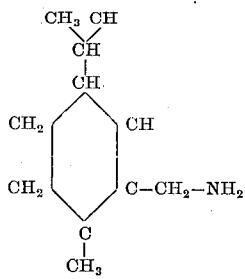
Isopropylmethyltetrahydrobenzylamin and

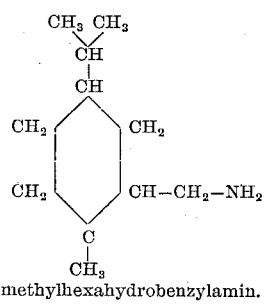
Isopropylmethylhexahydrobenzylamin.

1. Transformation of cis and trans-isopropyl-methyl-oxyhexahydrobenzylamin into isopropyl-methyl-chloro-hexahydrobenzylamin:

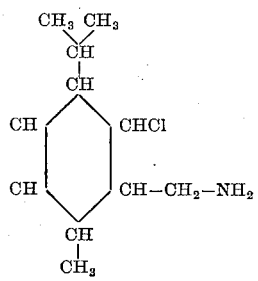

Eighty parts of each cis and trans-isopropyl-methyloxyhexahydrobenzylamin are each dissolved in one thousand parts of benzene, and the solutions are saturated with hydrogen-chlorid gas. In the first case (cis) a clear solution is formed; in the second case (trans) a crystalline paste. Into the liquids are then gradually introduced ninety-three parts each of phosphorous pentachlorid, (somewhat more than one molecule.) The solution of the pentachlorid of the cis base actively evolves hydrogen chlorid in the cold, while the hydrochlorid of the trans base suspended in benzene reacts only when heated with phosphorous pentachlorid and gradually becomes liquid. In both cases heating is continued on the water-bath as long as hydrogen chlorid is evolved. The two clear benzene solutions are further worked, as described, with the analogous chlorated bases in Example I under No. 1 and in Example II under No. 1. The chlorated bases obtained from cis and trans-isopropyl-methyl-oxyhexahydrobenzylamin are oils. Whether they are identical or different from each other could not be established. Both cases, however, produce on reduction (see under 3) one and the same isopropylmethylhexahydrobenzylamin.

2. Transformation of isopropylmethyl-chloro-hexahydrobenzylamin obtained according to No. 1 from cis-isopropylmethyloxy-hexahydrobenzylamin into isopropylmethyl-tetrahydrobenzylamin:

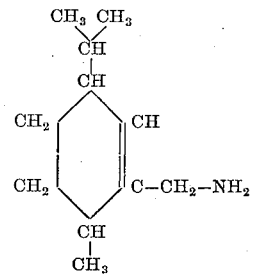

One part of isopropylmethyl-chloro-hexahydrobenzylamin is dissolved with five parts of hydrate of potash in five parts of alcohol, heated for several days at the inverted condenser, and on dilution with water the alcohol and the isopropylmethyl-tetrahydrobenzylamin formed are distilled with steam. The distillate is acidified and after a further expelling of the alcohol with steam is evaporated on the water-bath. Soda-lye separates the base from the remaining hydrochlorid as an oil, which when dried in the presence of hydrate of potash boils under ordinary atmospheric pressure at 230° centigrade without decomposing, colorless conine-like smelling oil, soluble with difficulty in water.

3. Manufacture of isopropylmethylhexahydrobenzylamin:

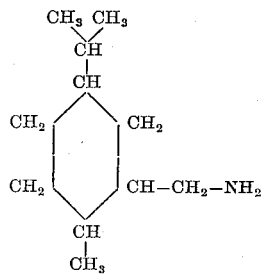

This base is obtained both from isopropyl-methyl-tetra-hydrobenzylamin produced as described under No. 2, as well as from the isopropyl-chloro-hexahydrobenzylamins obtained according to No. 1 from cis or trans-isopropylmethyl-oxy-hexahydrobenzylamin by treatment with reducing agents. One part each of said bases is hydrogenized in the usual manner with two parts of sodium and twenty parts of alcohol. After diluting with water the alcohol and the hexahydro base are distilled with steam. The distillate is acidified with hydrochloric acid and evaporated after distilling the alcohol on the water-bath. The base separated from the hydrochlorid by soda-lye boils when dried in the presence of hydrate of potash under ordinary atmospheric pressure at 226° to 228° centigrade without decomposing, colorless conine-like smelling oil, soluble with difficulty in water.

In a similar manner as described in the preceding three examples I have produced:

1. From isopropyl-methyl-hexahydro-oxy-benzylanilin:

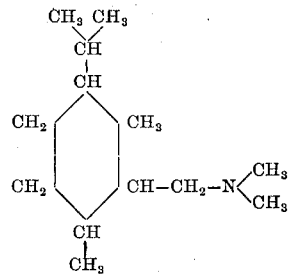

the two bases

Isopropylmethyl-tetrahydrobenzylanilin. (Oil, boiling-point 193° to 198° centigrade at thirteen millimeters pressure.)

and

Isopropylmethyl-hexahydrobenzylanilin. (Oil, boiling-point 215° centigrade at thirty-three millimeters pressure.)

2. From isopropyl-methyl-hexahydro-oxy-benzyldimethylamin:

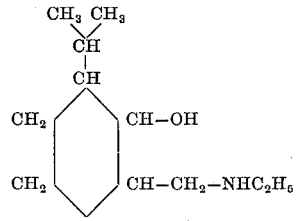

the two bases

Isopropylmethyl-tetrahydrobenzyldimethylamin. (Oil, boiling-point 124° to 128° centigrade at thirteen millimeters pressure.)

and

Isopropylmethyl-hexahydrobenzyldimethylamin. (Oil, boiling-point 111° to 113° centigrade at seventeen millimeters pressure.)

3. From isopropyl-methyl-hexahydro-oxy-benzylethylamin:

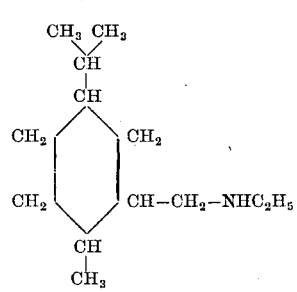

the base

Isopropylmethyl-hexahydrobenzylethylamin. Oil, boiling-point 135° to 140° centigrade.

4. From methyl-hexahydro-oxy-benzyl-anilin:

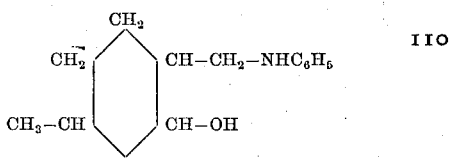

the base

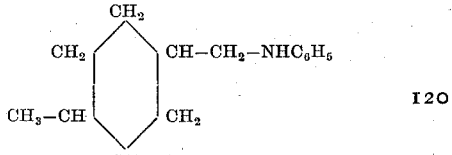

Methyl-hexahydrobenzylanilin. Oil, boiling-point 195° centigrade, (thirty millimeters pressure.)

I have further found that the hydrobenzyl-amin bases obtained according to the preceding process and of the type:

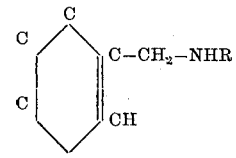 and 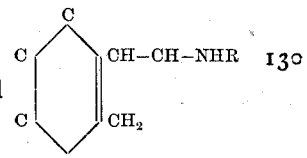

wherein R represents a fatty radical ($CH_3$, $CH_5$, $CH_2$, COOH, &c.) or an aromatic radical ($C_6H_5$, $C_6H_4$, $CH_3$, $C_6H_4$.OM, $C_6H_4$.COOH, &c.) may be transformed when carefully treated with oxidizing agents into hydrobenzylidene compounds of the general formula:

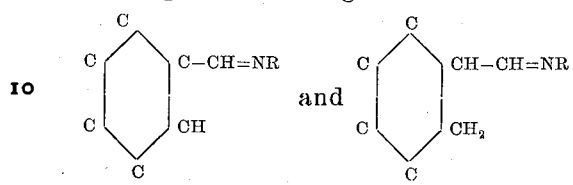

If these hydrobenzylidene compounds be heated with dilute mineral acids, they decompose, while acquiring the elements of water, into hydrogenized cyclic aldehydes (terpenaldehydes) of the type:

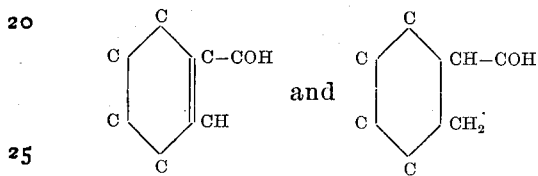

and the two bases $H_2NR$. To thus transform the hydrobenzylamin bases having an aromatic radical linked to the nitrogen into hydrogenized cyclic aldehydes (terpenaldehydes) it is best to employ acid oxidizing agents—such, for instance, as potassium bichromate and dilute sulfuric acid. The transformation of the supposed hydrobenzylamin bases into the hydrobenzylidene-anilin compounds and the decomposition of these into anilin (or their derivatives) and into hydrogenized cyclic aldehydes (terpenaldehydes) therefore takes place in a single operation.

To transform the hydrobenzylamin bases having a fatty radical linked to the nitrogen into hydrogenized cyclic aldehydes, it is best to transform first the bases by treatment with alkaline or neutral oxidizing agents—such, for instance, as red prussiate of potash or peroxid of hydrogen—into the corresponding hydrobenzylidene compounds and then to decompose these by heating them with dilute mineral acids. The terpenaldehydes obtained in either way are colorless oils and when concentrated have a poignant aromatic odor. When diluted, the first members of the series—such, for instance, as the aldehyde obtained from the methyl-tetra-hydrobenzylanilin (see my application before referred to)—

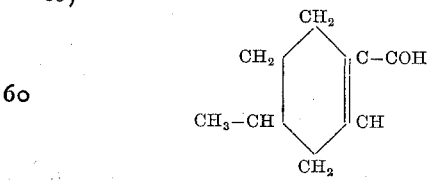

possess an odor similar to that of benzaldehyde. The middle and higher ones of the series have a more or less pronounced odor of plants or blossoms.

Example I: Manufacture of trimethyl-tetrahydrobenzaldehyde:

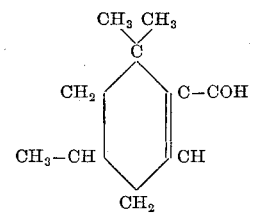

from trimethyl-tetrahydrobenzylanilin:

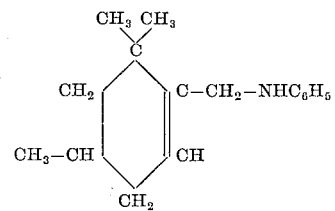

(See my application before referred to.) Five parts of the base are dissolved in eight hundred parts of water and sixty parts of sulfuric acid. A current of steam is introduced into the solution contained in a distilling apparatus, and into this boiling solution is dropped in a solution of forty-five parts of potassium bichromate and sixty parts of sulfuric acid in three hundred parts of water. The aldehyde thus formed distils over with the vapor as a colorless or yellowish oil. The aldehyde is eliminated from the aqueous distillate by repeatedly extracting with ether. The etherial solution is dried in the presence of anhydrous sodium sulfate, and the ether is slowly distilled on the water-bath. To purify the remaining oily aldehyde, it is transformed by extracting it with a concentrated solution of sodium bisulfite into the beautiful crystalline bisulfite compound, which is filtered, and after drying in the presence of sulfuric acid it is washed with pure anhydrous ether.

The bisulfite compound when dissolved in cold water decomposes partly in terpenaldehyde and sodium bisulfite. To completely decompose the compound, an excess of sodium carbonate is added, and this solution is heated on the water-bath. The separated yellow oil, dried in the presence of anhydrous sodium sulfate, is completely purified by distillation *in vacuo*. The trimethyl-tetrahydrobenzaldehyde is a thin colorless oil, having a melting-point of 90° to 91° centigrade at eighteen millimeters pressure. It may be mixed in any proportion with alcohol, ether, and benzene. It possesses when concentrated a poignant and slightly cedar-like odor and when much diluted a distinct smell of violet. It is isomeric with the cyclocitral of strebel.

Example II: Manufacture of trimethyl-hexahydrobenzaldehyde:

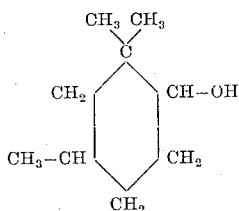

from trimethyl-hexahydrobenzylanilin:

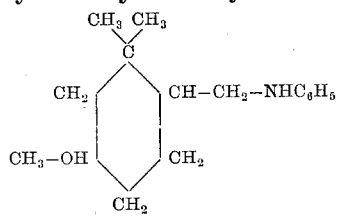

The manufacture of this aldehyde from trimethyl-hexahydrobenzylanilin is carried out exactly as that of tetrahydro-aldehyde described in Example I. The trimethyl-hexahydrobenzaldehyde is a colorless oil decomposing when distilled and of a plant-like exceedingly poignant odor.

Example III: Manufacture of isopropylmethylhexahydrobenzaldehyde:

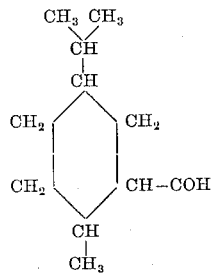

from isopropylhexahydrobenzylethylamin:

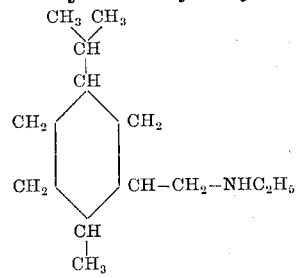

(See my application before referred to.) Twenty parts of the base are extracted by shaking for twelve hours with one hundred and eighty parts of hydrogen peroxid of two-per-cent. strength. The semiliquid base then becomes a viscous colorless resin, consisting principally of isopropyl-methyl-hexahydrobenzylideneëthylamin:

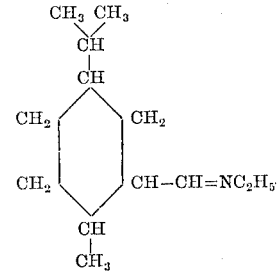

It is decomposed by heating with dilute sulfuric acid in a distilling apparatus, when the aldehyde formed distils with the steam. It is isolated in the same manner and purified as trimethyl-tetrahydrobenzaldehyde described in Example I. The isopropylmethyl-hexahydrobenzaldehyde is a colorless very poignant smelling oil. When diluted, its odor resembles that of the needle-like leaves of the fir-tree. The bisulfite compound crystallizes in colorless needles and partially decomposes with cold water into aldehyde and sodium bisulfite.

Example IV: Manufacture of isopropylmethyl-hexahydrobenzaldehyde:

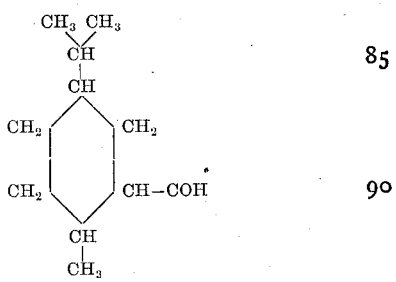

from isopropyl-methyl-hexahydrobenzylanilin. 24.5 parts of isopropyl-methyl-hexahydrobenzylanilin are heated for one-half hour with a solution of forty-five parts of prussiate of potash and fifteen parts of caustic alkali in four hundred parts of water. The solution having become a pure yellow, when cold is extracted with ether. The etherial solution is repeatedly washed with water and then distilled on the water-bath. The remaining thick oil, containing the benzal compound, is distilled with sulfuric acid of fifty-per-cent. strength, when the aldehyde goes over with the steam. It is then isolated in the usual manner.

The hydrogenized cyclic aldehydes obtained according to the present application are to be employed as such or in combination with other bodies as scents.

Having thus described my invention, I claim as new and desire to secure by Letters Patent—

1. The herein-described process of making hydrogenized cyclic aldehydes, which consists in transforming hydrobenzylamin bases by means of oxidizing agents into the corresponding hydrobenzyliden compounds and decomposing the same by heating with acids, substantially as set forth.

2. As a new product, the terpenaldehyde having the formula:

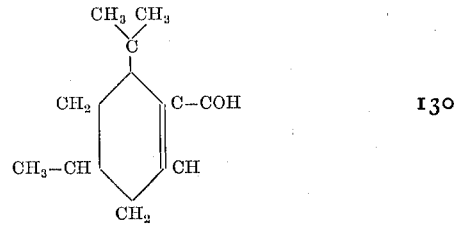

and being a colorless oil having a poignant smell when concentrated and an odor of violet when diluted, readily miscible with alcohol, ether and benzene, and having a boiling-point of 90° to 92° centigrade at thirteen millimeters pressure, substantially as set forth.

In testimony that I claim the foregoing as my invention I have signed my name in presence of two subscribing witnesses.

GEORG MERLING.

Witnesses:
 HEINRICH HAHN,
 ALFRED BRISBOIS.